United States Patent [19]
Ko et al.

[11] Patent Number: 5,566,293
[45] Date of Patent: Oct. 15, 1996

[54] METHOD AND APPARATUS FOR RECORDING AND DISPLAYING LIFE INFORMATION ON VCR

[75] Inventors: Young D. Ko, Seoul; Kyung K. Yoo; Se I. Cha, both of Kyungki-do; Y. Moon Cha, Seoul, all of Rep. of Korea

[73] Assignee: Goldstar Co., Ltd., Seoul, Rep. of Korea

[21] Appl. No.: 348,990

[22] Filed: Nov. 28, 1994

Related U.S. Application Data

[63] Continuation of Ser. No. 148,538, Nov. 8, 1993, abandoned, which is a continuation of Ser. No. 785,999, Oct. 31, 1991, abandoned.

[30] Foreign Application Priority Data

| Oct. 31, 1990 | [KR] | Rep. of Korea | 1990-17627 |
| Dec. 22, 1990 | [KR] | Rep. of Korea | 1990-21407 |
| Dec. 28, 1990 | [KR] | Rep. of Korea | 1990-22158 |
| Dec. 28, 1990 | [KR] | Rep. of Korea | 1990-22313 |
| Dec. 29, 1990 | [KR] | Rep. of Korea | 1990-22453 |

[51] Int. Cl.$^6$ .................................................. G06F 15/00
[52] U.S. Cl. ................................................ 395/156; 395/161
[58] Field of Search ...................................... 395/146, 147, 395/154, 161

[56] References Cited

U.S. PATENT DOCUMENTS

| 4,070,697 | 1/1978 | Miller et al. | 360/12 |
| 4,591,931 | 5/1986 | Baumeister | 360/72.1 |
| 4,689,022 | 8/1987 | Peers et al. | 434/307 |
| 4,715,010 | 12/1987 | Inoue et al. | 364/705 |
| 4,873,584 | 10/1989 | Hashimoto | 358/335 |
| 4,908,713 | 3/1990 | Levine | 358/335 |
| 4,977,455 | 12/1990 | Young | 358/142 |
| 5,001,696 | 3/1991 | Baldwin | 365/244 |
| 5,129,057 | 7/1992 | Strope et al. | 395/161 |
| 5,165,012 | 11/1992 | Crandall et al. | 395/100 |
| 5,181,273 | 1/1993 | Ohtani | 395/161 |
| 5,222,209 | 6/1993 | Murata et al. | 395/161 |
| 5,270,829 | 12/1993 | Yang | 358/335 |
| 5,307,173 | 4/1994 | Yuen et al. | 348/731 |

OTHER PUBLICATIONS

Webster's II, New Riverside University Dictionary, Riverside Publishing Co. 1984, p. 1116.

Primary Examiner—Mark R. Powell
Assistant Examiner—Ba Huynh

[57] ABSTRACT

An apparatus and method for recording and displaying life information in a VCR, comprising a data input unit for inputting key data, a microprocessor for sorting desired information data in accordance with the key data input unit to control storage and output of the desired information data and controlling such that the desired information is automatically output on a named date when the date named information for memorizing the named date is stored, a data bank unit for storing life information input by the user under control of the microprocessor, an output control unit for outputting the key data and the information data stored in the data bank unit as an on-screen display signal under the control of the microprocessor, and an output unit for displaying the desired information in accordance with an output signal from the output control unit. The present apparatus and method are capable of recording life information in a sorting manner, automatically displaying the recorded life information in a sorting manner, automatically displaying the recorded life information on a screen or informing the user of the recorded life information by a voice, on a corresponding date, and allowing the user to readily confirm the recorded life information if necessary.

30 Claims, 9 Drawing Sheets

FIG.4A

```
            MENU
   1.CLOCK SET
   2.NORMAL PROGRAM
   3.DAILY PROGRAM
   4.WEEKLY PROGRAM
   5.PROGRAM REVIEW
   [6]DATA BANK
        TO END PUSH MENU
```

FIG.4B

```
            DATA BANK
   [1]TELEPHONE NUMBER
   2.BIRTHDAY
   3.A MEMORIAL DAY
   4.DATE-NAMING INFORMATION
              •
              •
        TO END PUSH MENU
```

FIG.4C  "CR"

```
      TEL  NUMBER  PAGE=0
   NAME     AREA    NO
   S.M.LEE   02    683-7002
   I.G.LIM   02    699-6124
              •
              •
        TO END PUSH MENU
```

FIG.4D  "CR"

```
      TEL  NUMBER  PAGE=9
   NAME     AREA    NO
              •
              •
              •
              •
        TO END PUSH MENU
```

"CR" = CURSOR

FIG.7

| NAME/TITLE | YEAR | MONTH | DAY | INFORMATION |

METHOD AND APPARATUS FOR RECORDING AND DISPLAYING LIFE INFORMATION ON VCR

This application is a continuation of application Ser. No. 08/148,538 filed on Nov. 8, 1993, abandoned a continuation of parent application Ser. No. 07/785,999 filed on Oct. 31, 1991, now abandoned.

BACKGROUND OF THE INVENTION

The present invention relates in general to a method and apparatus for recording and displaying life information on a VCR, utilizing a data bank in the VCR, and more particularly to a method and apparatus for recording and displaying life information on a VCR, which are capable of recording life information to be memorized by the user in a sorting manner, automatically displaying the recorded life information on the screen or automatically informing the user of the recorded life information by a voice, on a corresponding date, and allowing the user to readily confirm the recorded life information if necessary.

Generally, the user records life information such as telephone numbers, memorial dates, appointment dates and etc. on a memorandom note to record it and then searches for the life information on the memorandom note to confirm the desired information as needed.

In data processing applications, the user stores the life information in a data bank in a VCR and then on-screen displays (OSD) the life information stored in the data bank on a monitor to confirm desired information as needed.

However, the method of recording and confirming desired life information utilizing the memorandom note has a disadvantage, in that the user does not search for the life information on the memorandom note without omission since he or she frequently forgets the desired date due to his or her busy daily life. Also, it is difficult to search for the life information on the memorandom note when the recorded life information is large in quantity, On the other hand, the method of storing desired life information in the data bank in the VCR and confirming the desired life information through the monitor has a disadvantage, in that the data bank display mode is selected depending on user's memory similarly to the method utilizing the memorandom note since the life information is merely stored in the data bank and is then displayed on the monitor when the data bank display mode is selected by the user. Also, similarly to the method utilizing the memorandom note, it is difficult to search for the life information when the recorded life information is large in quantity.

SUMMARY OF THE INVENTION

Therefore, it is an object of the present invention to provide a method and apparatus for recording and displaying life information on a VCR, which are capable of storing life information to be memorized by the user in a data bank, automatically displaying the stored life information on the screen or automatically informing the user of the stored life information by a voice, on a corresponding date, and allowing the user to readily confirm the stored life information if necessary.

In accordance with one aspect of the present invention, there is provided a method of recording and displaying life information on a VCR, comprising the steps of: (a) on-screen displaying types of data in a data bank if a menu of said data bank is selected; (b) selecting record/display modes after selection of the data type; (c) performing information recording if the record mode is selected at the step (b); (d) performing information display mode if the display mode is selected at said step (b); and (e) automatically displaying the corresponding information on a named date if date named information is stored in the data bank during performing of a main routine.

In accordance with another aspect of the present invention, there is provided an apparatus for recording and displaying life information on a VCR, comprising: data input for inputting key data; a microprocessor for sorting desired information data in accordance with the key data from the data input to control storage and output of the desired information data and controlling such that the desired information is automatically output on a named date when date named information for memorizing the named date is stored; data bank for storing life information being input by the user under a control of the microprocessor; output control for outputting the key data and the information data stored in the data bank as an on-screen display signal under a control of the microprocessor; and output for on-screen displaying the desired information in accordance with an output signal from the output control.

BRIEF DESCRIPTION OF THE DRAWINGS

The above and other objects, features and advantages of the present invention will be more clearly understood from the following detailed description taken in conjunction with the accompanying drawings, in which:

FIGS. 4A to 4D are schematic views explaining menu of the VCR and data sort pattern of a data bank unit shown in FIG. 2 in accordance with the present invention;

FIG. 7 illustrates a data input pattern according to the present invention;

DETAILED DESCRIPTION OF PREFERRED EMBODIMENTS

Figure 1:
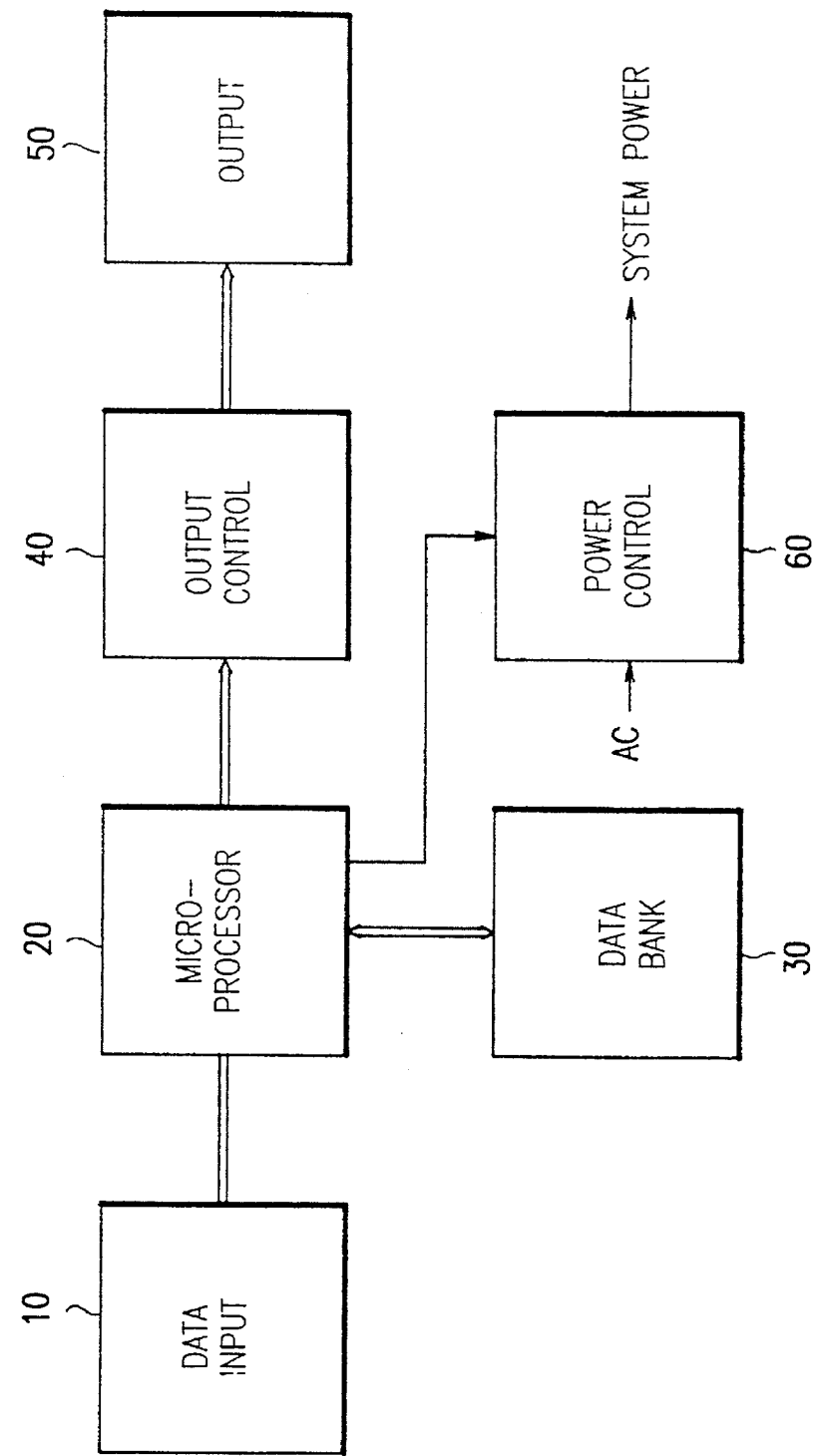
FIG. 1 is a block diagram of an apparatus for recording and displaying life information on a VCR in accordance with the present invention.

With reference to FIG. 1, there is shown a block diagram of an apparatus for recording and displaying life information on a VCR in accordance with the present invention. As shown in this drawing, the apparatus according to the present invention comprises a data input unit 10 for inputting key data, a microprocessor 20 for sorting-processing desired information data in accordance with the key data from the data input unit 10 to control storage and output of the desired information data and controlling such that the desired information is automatically output on a named date when date named information for memorizing the named date is stored, a data bank unit 30 for storing life information being input by the user under a control of the microprocessor 20, an output control unit 40 for outputting the key data and the information data stored in the data bank unit 30 as an on-screen display signal or a voice signal under a control of thee microprocessor 20, an output unit 50 for on-screen displaying the desired information or outputting a voice corresponding to the desired information in accordance with an output signal from the output control unit 40, and a power control unit 60 for controlling a main power of the system under a control of the microprocessor 20.

Figure 2:
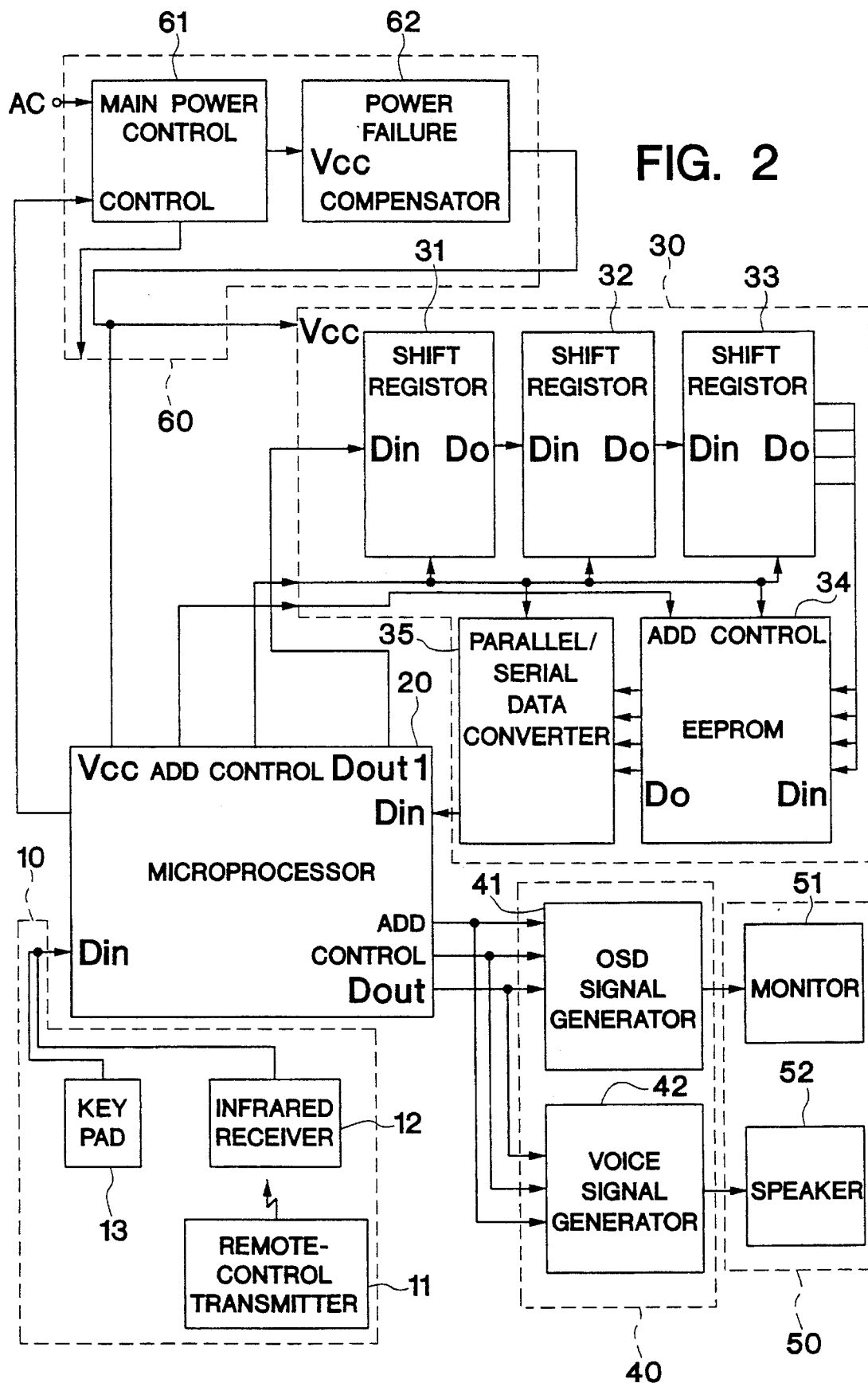
FIG. 2 is a circuit diagram of the apparatus in FIG. 1 in accordance with an embodiment of the present invention.

With reference to FIG. 2, there is shown a circuit diagram of the apparatus in FIG. 1 in accordance with an embodiment of the present invention. As shown in this drawing, the data input unit 10 includes a remote control transmitter 11 for inputting the key data, an infrared receiver 12 for receiving the key data from the remote control transmitter 11 and outputting the received key data to the microprocessor 20, and a key pad 13 for inputting the key data and outputting the key data to the microprocessor 20.

The data bank unit 30 includes shift registers 31, 32 and 33 for shifting sequentially serial data to be stored to convert the serial data into parallel data under the control of the microprocessor 20, an erasable and programmable read only memory (EPROM) 34 for storing the parallel data from the shift register 33 in accordance with control and address signals from the microprocessor 20, and a parallel/serial data converter 35 for converting the :parallel data being outputted from the EPROM 34 into serial data.

Also, the output control unit 40 includes an on-screen display signal generator 41 for outputting the key data and the information data as the on-screen display (OSD) signal under the control of the microprocessor 20 and a voice signal generator 42 for outputting the key data and the information data as the voice signal under the control of the microprocessor 20.

The output unit 50 includes a monitor 51 for on-screen displaying the desired information on the screen in accordance with the on-screen display signal from the on-screen display signal generator 41 in the output control unit 40' and a speaker 52 for outputting the voice corresponding to the desired information in accordance with the voice signal from the voice signal generator 42 in the output control unit 40.

On the other hand, the power control unit 60 includes a main power controller 61 for voltage-dropping and rectifying an external power AC to output a system power Vcc under the control of the microprocessor 20 and a power failure compensating circuit 62 for compensating an instant power failure of the power Vcc outputted from the main power controller 61 by a power failure compensating condenser and supplying the compensated power Vcc as operating power to the data bank unit 30 and the microprocessor 20.

Figure 3:
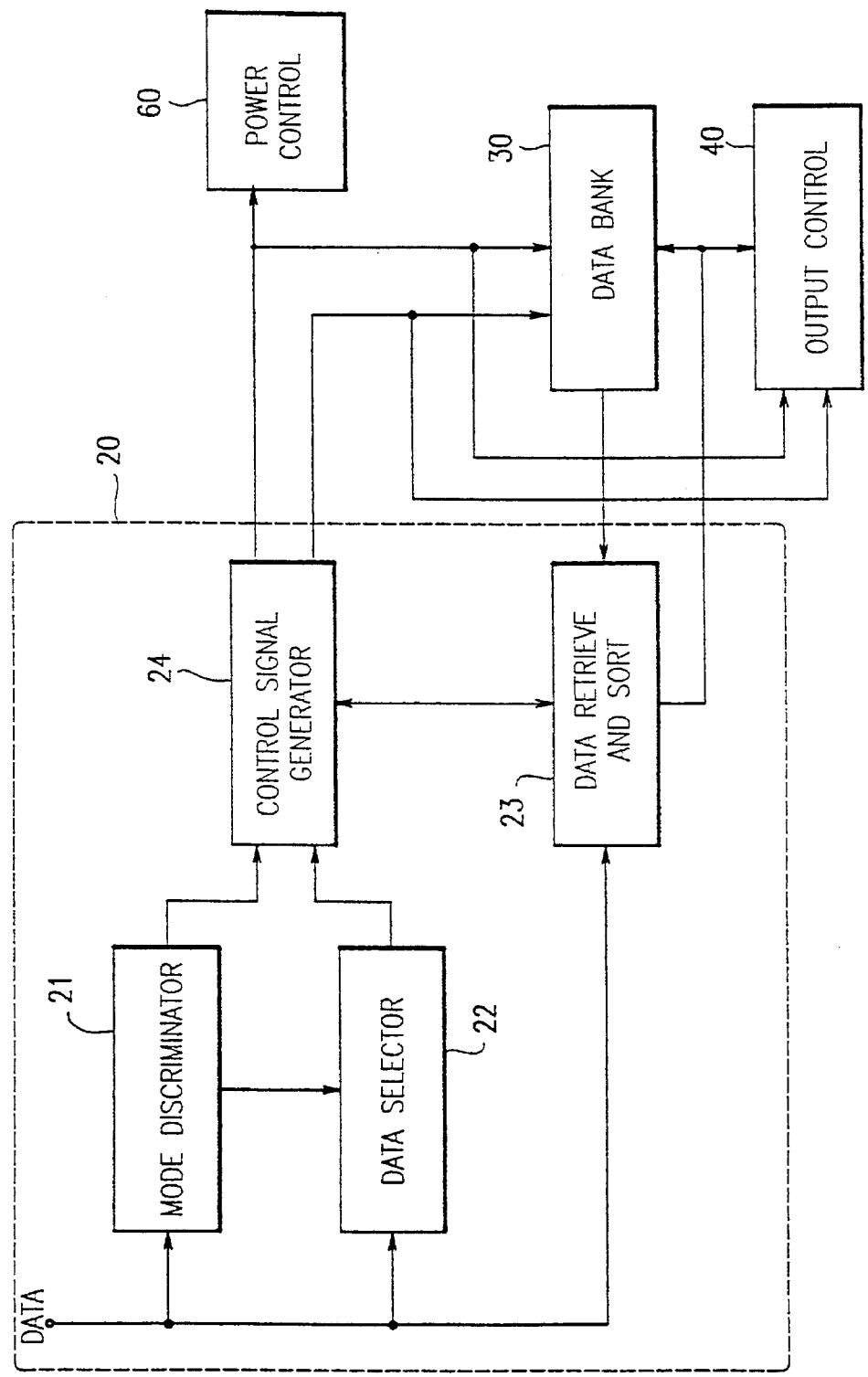
FIG. 3 is a functional block diagram of a microprocessor shown in FIG. 2.

With reference to FIG. 3, there is shown a functional block diagram of the microprocessor 20 shown in FIG. 2. As shown in this drawing, the microprocessor 20 includes a mode discriminator 21 for discriminating whether the current mode of the data bank unit 30 is a record mode or an output mode, a data selector 22 for selecting one of data types such as telephone number, memorial day, appointment day, birthday and etc., a data retrieving and sorting section 23 for retrieving and sorting the key data and the data stored in the data bank unit 30, and a control signal generator 24 for controlling the data retrieving and sorting section 23 in accordance with control signals from the mode discriminator 21 and tile data selector 22 and a sorting state signal from the data retrieving and sorting section 23 and generating the address and control signals to the data bank unit 30 and the output control unit 40. Control signal generator 24 also supplies control signals to power control 60, as seen in FIG. 2.

Now, the operation of the apparatus with the above-mentioned construction in accordance with the present invention will be described in detail.

Figure 5:
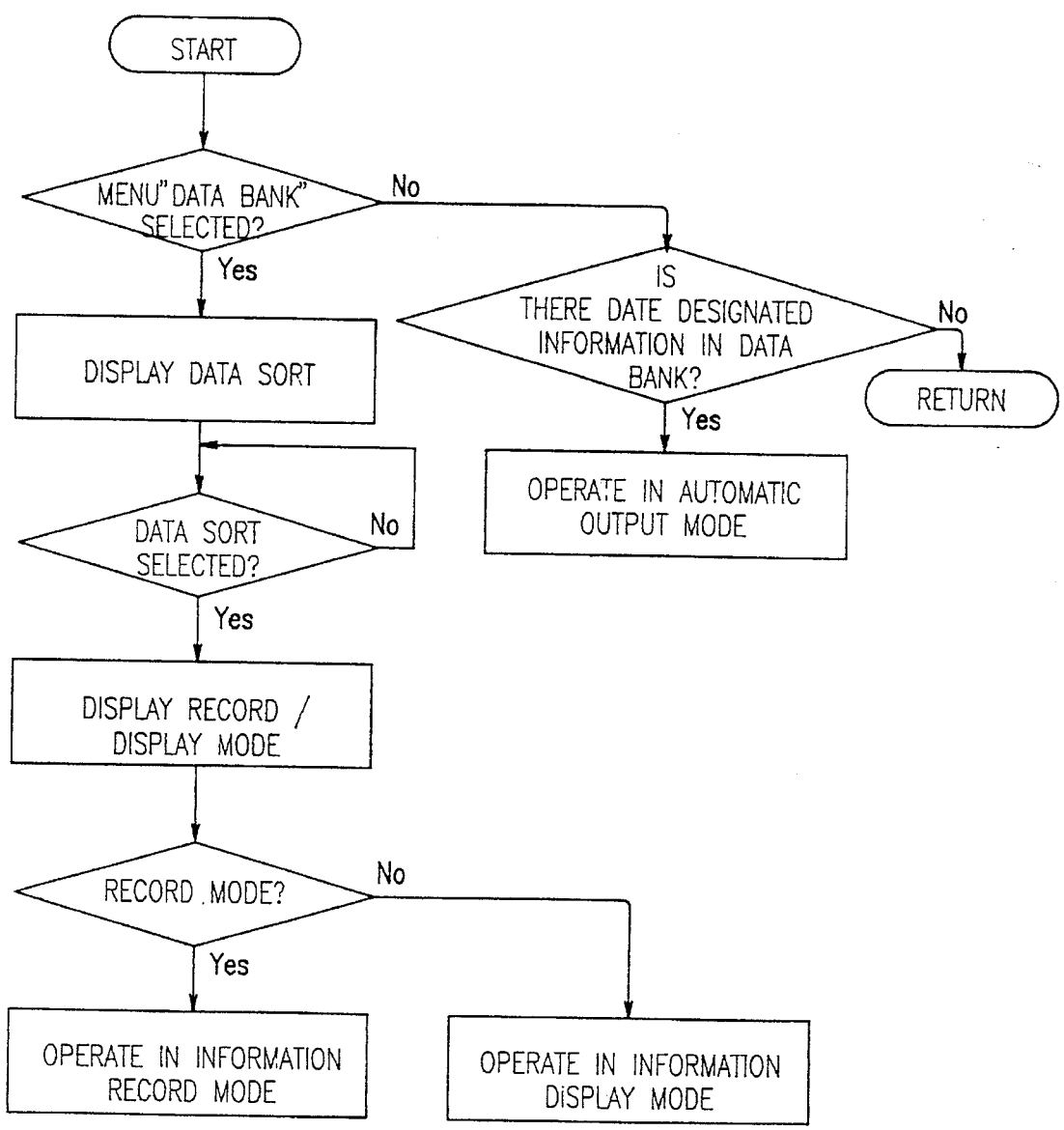
FIG. 5 is a flowchart of a process for controlling the record and display of the life information on the VCR.

FIGS. 4A to 4D are schematic views explaining menu of VCR and data sort pattern of data bank unit in accordance with the present invention, while FIG. 5 is a flowchart of a process for controlling the recording and display of life information on VCR. When menu selection has been made by means of the remote control transmitter 11 or the key pad 13 as shown in FIG. 5, the character "RENU" and various menu set in VCR are displayed as shown in FIG. 4A. If, for example, data bank menu is then selected, the character "DATA BANK" and data stored in the data bank unit as shown in FIG. 4B are displayed. Herein, the data type is the table of contents indicative of the data type set in the data bank unit. Various data types such as telephone number, birthday, memorial day, appointment date, and etc. are set to be used, if desired. FIG. 4C illustrates a list of entries for the telephone number data type and FIG. 4D illustrates an end of the list of entries for the telephone number data type. On the other hand, the date named information is the information the date of which is to be memorized. Date naming can be selected by the user according to data input pattern in record mode.

If a desired data type has been selected after the selection of data bank menu, information record/display mode selection is displayed so that the user select the information record mode or the information display mode. In the information record mode, newly inputted information and previously stored information are sorted in order. The resultant information is stored in the EPROM 34 in the data bank unit. On the other hand, in the information display mode, the information corresponding to the selected data type is displayed on-screen. Also, it is checked during the execution of the main routine; illustrated in FIG. 5, whether date naming information has been stored as the information in the data bank unit. If the date named information has been included, automatic output mode Is performed in which when the named date of the date named information corresponds to the current date, the information is automatically output.

Figure 6:
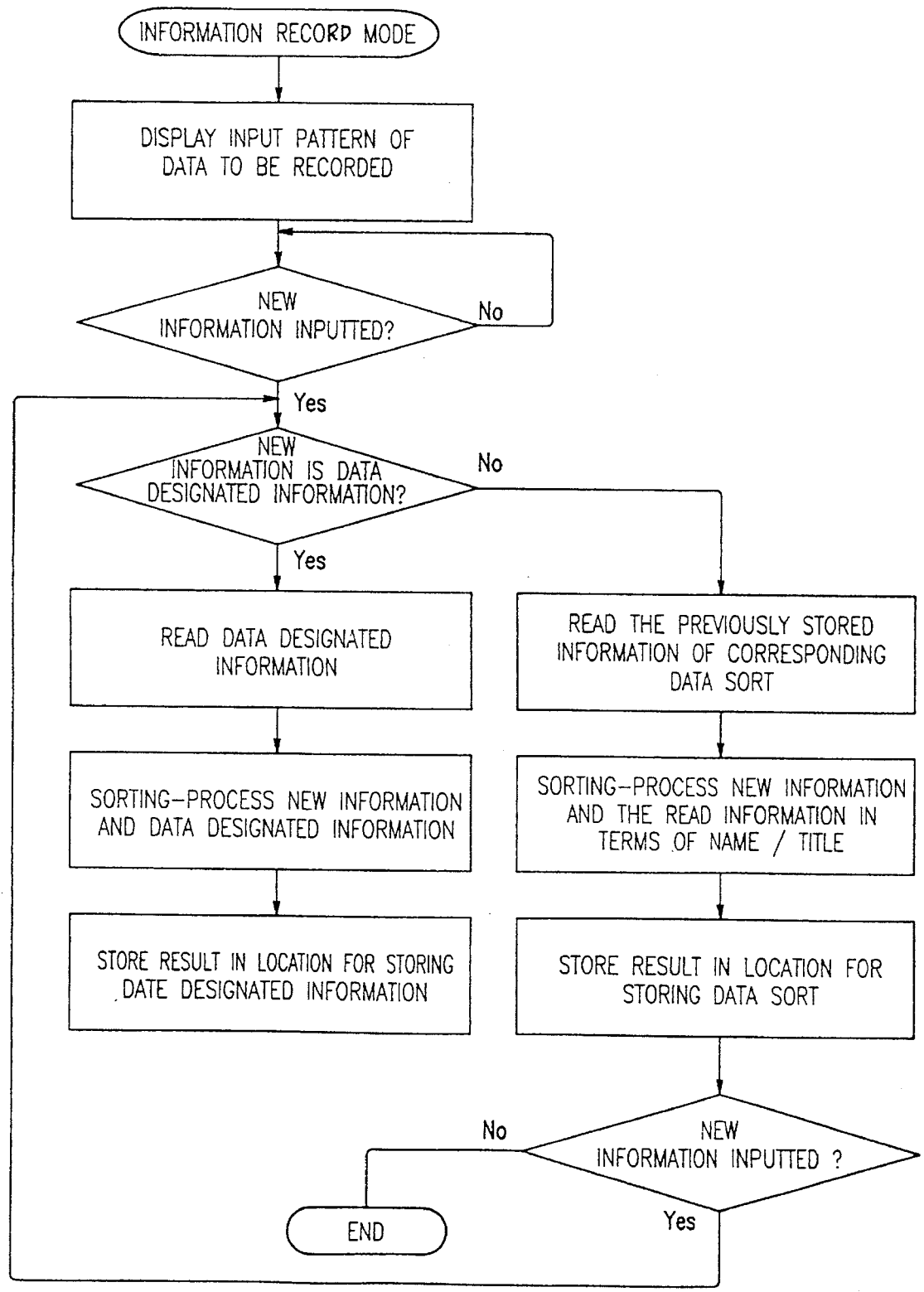
FIG. 6 is a flowchart of the operation of the apparatus in FIG. 2 in a life information record mode.
Figure 7:
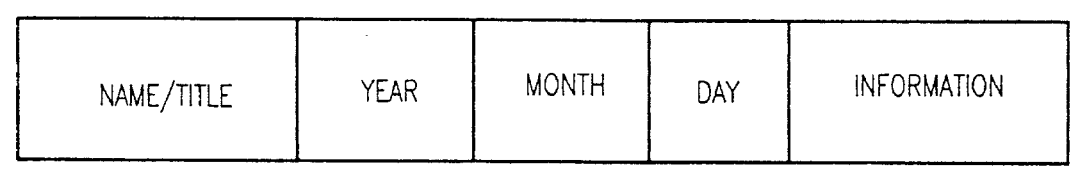

FIG. 6 is a flowchart of the operation of the apparatus in the life information :record mode. As shown in the drawing, the input pattern of data to be recorded is displayed so that the user can input the information to be stored according to the input pattern. The input pattern is adapted to input orderly various data indicated by "name/title, year, month, day and information" in FIG. 7. The discrimination for date named information is performed by the microprocessor 20. When data "year", "month" and "day" of information have been input, the microprocessor 20 discriminates the information as the date named information and automatically sorts the data. If newly input information has been discriminated as the date named information, the microprocessor 20 reads the date named information from the data bank unit 30 and then sorts the read information and the new information, in terms of date. The sorted result is then stored in the date named information storing area of the data bank unit. The corresponding page on the screen is displayed on-screen for a predetermined period. If the new information has not been added as date named information, that is if it has no data "year", "month" and "day" in its input pattern, as in the case of telephone number, the new information together with the previously stored information are sorted, in terms of name or title. The result is stored and displayed on-screen. Thereafter, if there is no input of new information, the information storing operation is ended. Since the previously stored information is already stored data, the sorting involves only sorting for discriminating the address for the new information by comparing the new information and the previous information so as to determine the priority and then a step for storing the new information in a location corresponding to the address.

Figure 8:
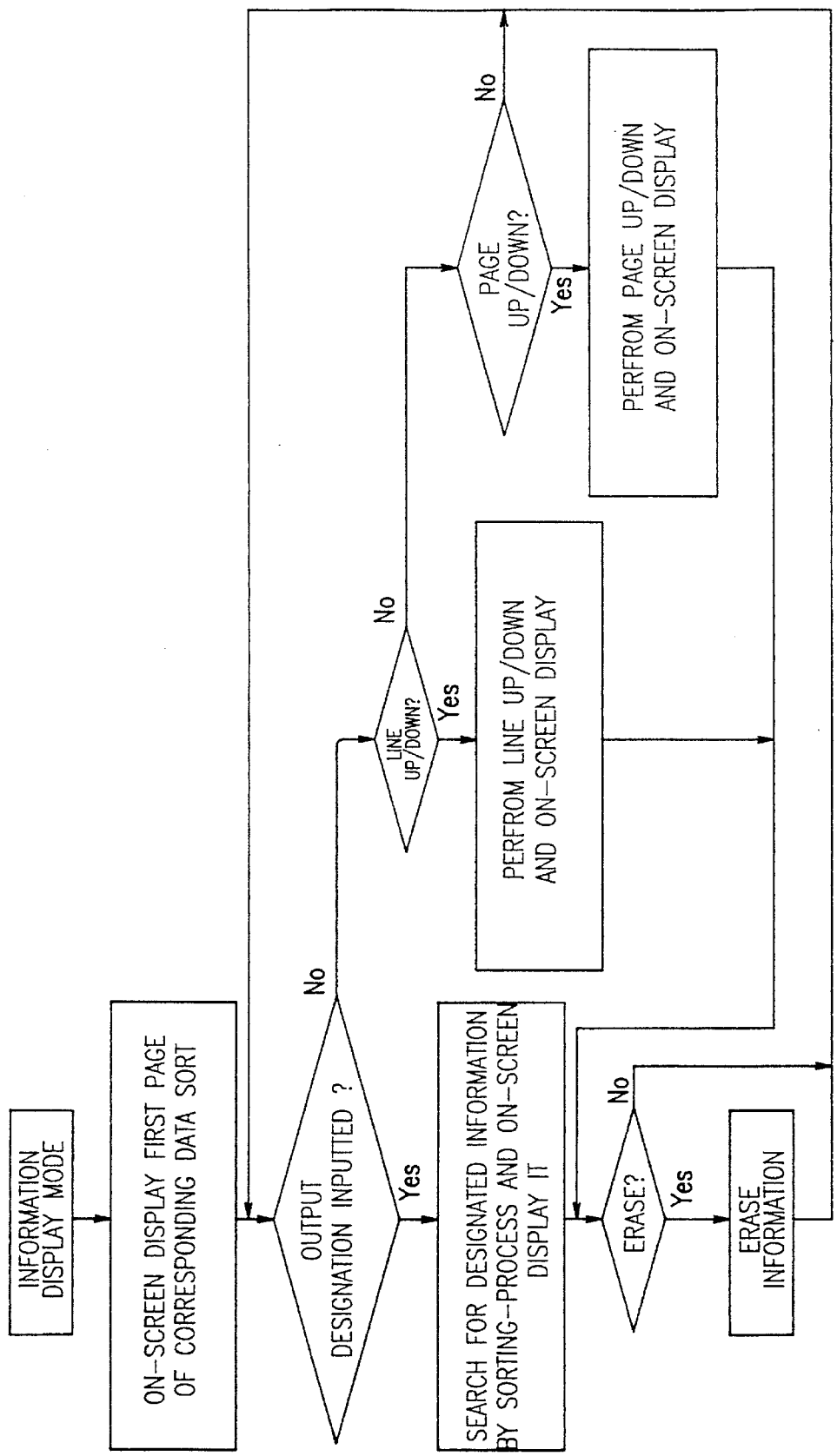
FIG. 8 is a flowchart of the operation of the apparatus in FIG. 2 in a life information display mode.

FIG. 8 is a flowchart of the operation of the apparatus in the life information display mode. As shown in the drawing, if no output designation is input for information which the user request, the desired information is only searched for by the designation of line up/down or page up/down. If name/title or date of the information to be searched for has been input, the data which has been designated to be output is searched for by sorting and then displaying on-screen. When the first character of name/title has been input as the output designation input, all information relating to names/titles which have identical first characters is output. If the full name has been input, information corresponding to the full name is searched for and output. In the case of date named information, data "year" and "month" of the information to be searched for is input so that all information corresponding to the data "year" and "month" can be output. Otherwise, according to the inputting of data "year", "month" and "day", information relating to the designated date may be output. When the output designation input has been designated to be displayed on the screen, only the desired information or the page including it is displayed on the screen.

Figure 9:
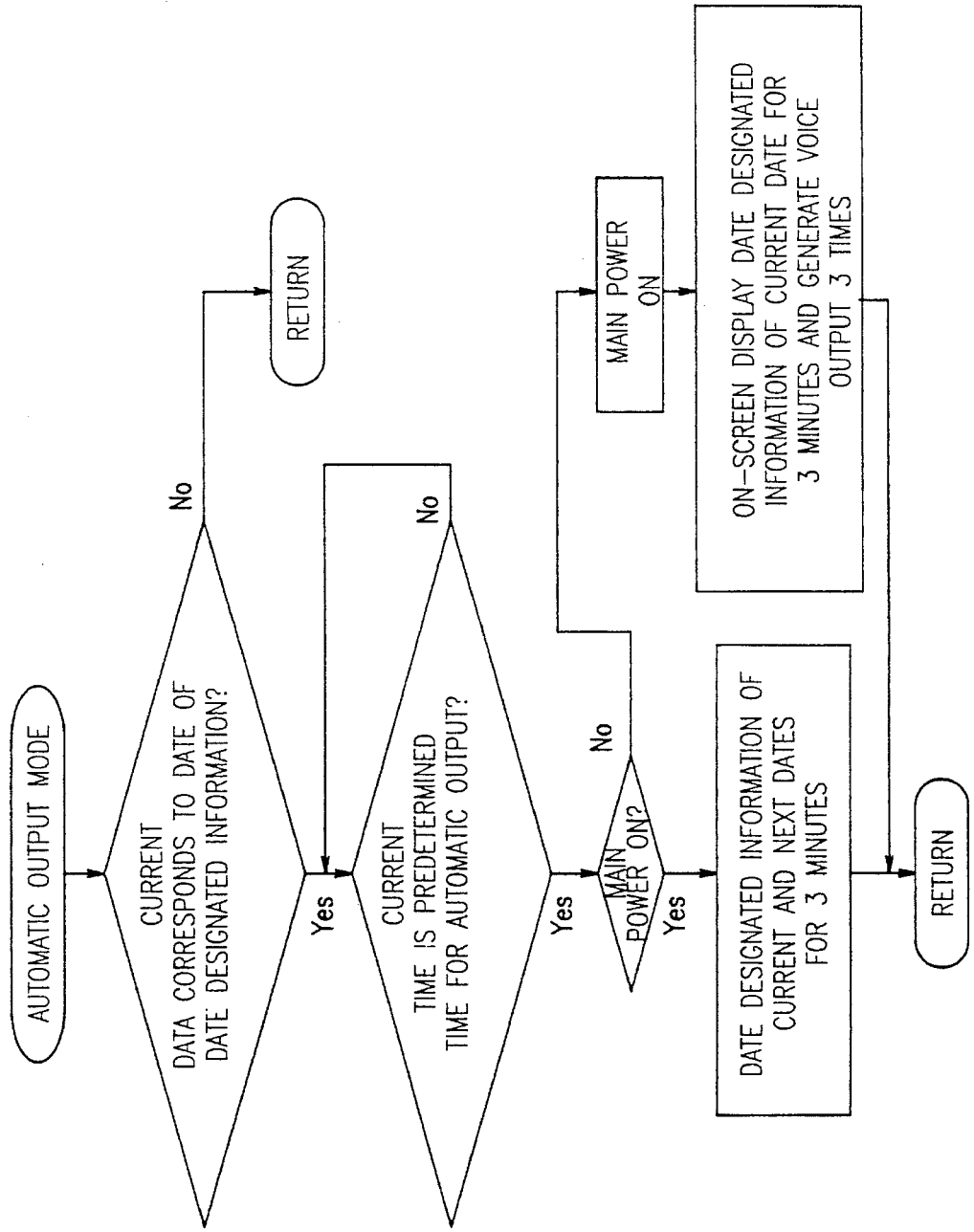
FIG. 9 shows a flowchart of the operation of the apparatus in FIG. 2 in a life information automatic output mode.

If it is discriminated that date designated information is presented, according to the retrieval of information stored in the data bank unit during the processing of the main routine, the automatic output mode is performed. FIG. 9 shows the operation in this automatic output mode, As shown in the drawing, if the designated date of the date designated information corresponds to the current date, it is checked whether the current time is the predetermined time for automatic output. The predetermined time for automatic output is the time optionally set by the user and may be, for example, 06:00, 07:00, 08:00, 18:00, 19:00 or 20:00. At this time, the user can visually or vocally confirm the information through a monitor or a speaker. In the case of vocal confirmation, voice output is generated at least one time. If the date of the date designated information is the current date and if the current time reaches the predetermined time for automatic output, it is then checked whether the main power of the system is ON. When the main power is ON, all date designated information corresponding to the current date and the next date are displayed on-screen for a predetermined period. Simultaneously, the voice output for the date designated information corresponding to the current date is repeatedly generated a predetermined number of times. The voice output may be, for example, "today is . . . day".

The control of recording, displaying and automatic outputting of the life information as mentioned above is performed by the microprocessor 20. As shown in FIG. 3, the microprocessor 20 discriminates the data bank mode and then record/display mode at the mode discriminator 21, and selects a data type to be recorded/displayed at the data selector 22. Then, the control signal generator 24 in the microprocessor 20 generates the address and control signals to the data bank unit 30 in accordance with the output signals from the mode discriminator 21 and the data selector 22 to control reading of the data in the EPROM 34 in the data bank unit 30. As a result, the data retrieving and sorting section 23 retrieves the previously stored data and sorts the data with new information. Also, the control signal generator 24 controls storage and output of the sorted data.

The data bank unit 30 inputs the sorted data from the microprocessor 20, converts the input, serial data into the parallel data at the shift registers 31 through 33 and then stores the parallel data into the EPROM 34. Then, the parallel/serial data converter 35 in the data bank unit 30 converts the data stored in the EPROM 34 into the serial data under the control of the microprocessor 20. The data output from the data bank unit 30 under the control of the microprocessor 20 is generated as the on-screen display signal by the on-screen display signal generator 41 in the output control unit 40 or as the voice signal by the voice signal generator 42 in the output control unit 40. Then, the on screen display (OSD) signal from the output control unit 40 is displayed on the screen of the monitor 51 and the voice signal is outputted through the speaker 52. On the other hand, in the power control unit 60, the main power controller 61 voltage-drops and rectifies the external power AC to output the system power Vcc under the control of the microprocessor 20 and the power failure compensating circuit 62 compensates an instant power failure of the power Vcc output from the main power controller 61 and supplies the compensated power Vcc to the data bank unit 30 and the microprocessor 20.

As apparent from the above description, the present invention provides a method and; an apparatus for recording and displaying life information on a VCR, which are capable of recording life information in a sorting manner and by utilizing a data bank in the VCR, automatically displaying the recorded life information on the screen according to the output designation. In accordance with the present invention, the data "year", "month" and "day" of the date designated information is sorted to be stored in the date designated information location of the data bank unit. When the data "year", "month" and "day" of the information to be searched for is designated, all information having the corresponding data "year", "month" and "day" are output. Accordingly, desired information can be easily searched for, even when massive information is stored. As the current date reaches the date of the date designated information, the system is automatically operated so as to automatically display the corresponding information on the screen and automatically inform the user of the information by a voice. As a result, the user can always recognize the life information, without forgetting it.

Although the preferred embodiments of the present invention have been disclosed for illustrative purpose, those skilled in the art will appreciate that various modifications, additions and substitutions are possible, without departing from: the scope and spirit of the invention as disclosed in the accompanying claims.

What is claimed is:

1. A method of storing and thereafter retrieving life information, such as telephone numbers, appointment dates, and the like, utilizing a VCR in which stored life information associated with a specific future date is retrieved and presented automatically at at least one selected time on the specific future date, the method comprising the steps of:

(a) displaying on a display associated with the VCR a menu identifying types of life information data that can be stored into a data bank associated with the VCR;

(b) selecting a type of life information data from the displayed menu;

(c) displaying the selected type of life information:

(d) selecting a record mode to record life information into the data bank;

(e) storing alphanumeric characters representing the life information desired to be recorded in the data bank, which life information may include date named information associated with a specific future date; and (f) when the specific future date arrives, displaying automatically at the selected time all life information stored in the data bank that is associated with the specific date.

2. The method of claim 1, wherein the following steps are included after step (e):

(e') reselecting the type of recorded life information data; and (e'') selecting a display mode to retrieve the type of life information stored in the data bank.

3. The method of claim 2, wherein step (e) includes the sub-steps of:

(e-1) displaying a data input pattern corresponding to the selected type of life information data;

(e-2) discriminating whether new life information has been input;

(e-3) discriminating whether the new life information is date named life information;

(e-4) performing date named life information processing if the new life information is date named life information;

(e-5) sorting the newly recorded life information according to the selected type of life information data if the newly recorded life information data is other than date named life information or if the date named life information processing is complete; and (e-6) storing the result in the data bank.

4. The method of claim 3, wherein sub-step (e-4) includes the further sub-steps of:

(e-4-1) reading the date named life information from the data bank if the newly recorded life information is date named information; and (e-4-2) sorting the newly recorded life information with the read date named life information by date.

5. The method of claim 4, wherein sub-step (e-6) includes the further sub-steps of:

(e-6-1) storing the sorted result in a date named life information storage area in the data bank; and (e-6-2) displaying the stored result.

6. The method of claim 3, wherein sub-step (e-4) includes the further sub-steps of:

(e-4-1') reading previously stored life information of the selected type of life information data from the data bank; and (e-4-2') sorting the newly recorded life information with the read previously stored life information by name/title.

7. The method of claim 6, wherein sub-step (e-6) includes the further sub-steps of:

(e-6-1') storing the sorted result in a date named life information storage area in the data bank; and (e-6-2') displaying the stored result.

8. The method of claim 3, wherein the data input pattern includes the fields of "name/title," "year," "month," "day," and "information," each having an appropriate number of characters.

9. The method of claim 3, wherein sub-step (e-3) includes the further sub-step of discriminating the newly recorded life information as date named information if the newly recorded life information includes date information in the fields of "year," "month," and "day."

10. The method of claim 2, wherein the following additional step is included:

(e''') displaying the selected type of life information from the data bank.

11. The method of claim 10, wherein step (e''') includes the sub-steps of:

(e'''-1) displaying a first page of life information data of the selected type of life information data;

(e'''-2) discriminating whether a specific output designation has been input:

(e'''-3) if a specific output designation has been input, searching the data bank for life information data corresponding to the specific output designation by sorting;

(e'''-4) displaying the retrieved information;

(e'''-5) if no specific output designation has been input, searching the data bank for life information data corresponding to the selected type of life information data;

(e'''-6) displaying the retrieved life information; and (e'''-7) scanning the displayed retrieved life information by performing line and page up/down operations.

12. The method of claim 11, wherein there is further included the sub-step of:

(e'''-1') inputting as a specific output designation a full name/title for the "name/title" field of the selected type of life information data.

13. The method of claim 11, wherein there is further included the sub-step of:

(e'''-1')) inputting as a specific output designation at least a first character of a full name/title for a "name/title" field of the selected type of life information data.

14. The method of claim 11, wherein there is further included the sub-step of:

(e'''-1') displaying the life information data corresponding to the specific output designation only when a specific output designation has been input.

15. The method of claim 11, wherein there is further included the sub-step of:

(e'''-8) erasing the corresponding life information data from the data bank by inputting an erase command during the life information display mode.

16. The method of claim 2, wherein step (f) includes the sub-steps of:

(f-1) discriminating whether date named life information corresponding to the current date is stored in the data bank;

(f-2) if date named life information corresponding to the current date is stored in the data bank, discriminating whether current time of day matches a predetermined automatic output time of day; and (f-3) if the current time of day matches the predetermined automatic output time of day, displaying the date named life information corresponding to the current date for a predetermined period of time.

17. The method of claim 16, wherein sub-step (f-3) further includes the sub-steps of:

(f-3-1) if the current time of day matches the predetermined automatic output time of day, discriminating whether main power for the VCR is ON;

(f-3-2) if the main power for the VCR is ON, displaying the date named life information corresponding to the current date; and (f-3-3) if the main power for the VCR is OFF, displaying the date named life information corresponding to the current date after turning ON the main power of the VCR.

18. The method of claim 17, wherein sub-step (f-3-2) further includes the sub-step of:

(f-3-2-1) if the main power for the VCR is ON, displaying the date named life information corresponding to the current date and its immediately succeeding date.

19. The method of claim 17, wherein sub-step (f-3-2) further includes the sub-step of:

(f-3-2-1) outputting a vocal statement corresponding to the date named life information corresponding to the current date.

20. The method of claim 19, wherein the vocal statement is output a predetermined number of times.

21. The method of claim 17, wherein the predetermined automatic output time of day is selected to be at least one time of day when the VCR is normally in operation or when a user of the VCR is normally present.

22. An apparatus for storing and thereafter retrieving life information, including telephone numbers, appointment dates, and the like, utilizing a VCR in which recorded information associated with a specific date is retrieved and presented automatically at at least one future selected time, the apparatus comprising:

data input means for inputting alphanumeric life information data;

microprocessor means for sorting a selected type of life information data corresponding to the type of life information data input from the data input means so as to control the storage and output of the life information data, and for controlling the output of the life information data such that the stored life information data is automatically output on a named date when date named life information data for the named date is stored;

data bank means for storing life information data input by a user under the control of the microprocessor means;

output control means for outputting life information data stored in the data bank means as an on-screen display signal under the control of the microprocessor means;

output means for displaying a desired type of life information data and the automatically output date named life information data for the current date in accordance with the on-screen display signal from the output control means.

23. The apparatus of claim 22, wherein the microprocessor means comprises:

a mode discriminator for discriminating whether a current mode of the data bank means is a record mode or an output mode;

a data selector for selecting one of a plurality of types of life information data to be either stored or retrieved;

a data retrieving and sorting section for retrieving and sorting the types of life information data stored in the data bank means; and a control signal generator for controlling the data retrieving and sorting section in accordance with control signals from the mode discriminator and data selector and a sorting state signal from the data retrieving and sorting section and generating address and control signals to the data bank means and the output control means.

24. The apparatus of claim 22, wherein the data bank means comprises:

first to third shift registers for sequentially shifting serial input life information data to be stored in the data bank means to convert the serial input data into parallel data under control of the microprocessor means;

an EPROM for storing the parallel data received from the third shift register in accordance with the control and address signals from the microprocessor means; and a parallel/serial data converter for converting the parallel data output from the EPROM into serial data.

25. An apparatus for storing thereafter retrieving life information, such as telephone numbers, memorial dates, appointment dates, birthdays and the like, utilizing a VCR in which recorded information associated with a specific date is retrieved and presented automatically at at least one future selected time, the apparatus comprising:

data input means for inputting alphanumeric life information data;

microprocessor means for sorting a selected type of life information data corresponding to the type of life information data input from the data input means so as to control the storage and output of the life information data, and for controlling the output of the life information data such that the stored life information data is automatically output on a named date when date named life information data for the named date is stored;

data bank means for storing life information data input by a user under the control of the microprocessor means;

output control means for outputting life information data stored in the data bank means as an on-screen display signal under the control of the microprocessor means;

output means for displaying a desired type of life information data and the automatically output date named life information data for the current date in accordance with the on-screen display signal from the output control means;

wherein the output control means includes a voice signal generator for outputting the automatically output date named life information data for the current date and any selected type of life information as a voice signal to an external speaker under control of said microprocessor means.

26. A method of storing life information related to a date and thereafter retrieving said life information utilizing a VCR, comprising the steps of:

(a) displaying a menu on a monitor connected to the VCR, said menu representing types of life information which can be stored in a data bank memory;

(b) selecting a type of said life information from said data menu;

(c) displaying the selected type of life information;

(d) selecting a record mode to store said life information in the data bank memory;

(e) inputting life information data corresponding to the selected type of life information, said life information data being composed of numbers and characters, for storage in the data bank memory, said life information data including a named date;

(f) discriminating whether data related to the current date is stored in the data bank memory when current time is a predetermined time during a day;

(g) if so, discriminating whether the current date is a predetermined date related to said named date; and (h) if so, displaying all of the life information that is stored in the data bank memory for the current date and the predetermined date related to said named date superimposed on the monitor for a predetermined period of time.

27. The method of claim 26, wherein said predetermined date in step (g) is a date prior to said named date.

28. The method of claim 26, wherein the following steps are included after step (e):

(e') reselecting the type of recorded life information data; and (e") selecting a display mode to retrieve the type of life information stored in the data bank.

29. An apparatus for storing life information related to a date and thereafter retrieving said life information utilizing a VCR, comprising:

(a) data input means for inputting life information data composed of numbers and characters, said life information data including a named date;

(b) timer means for checking current time and date;

(c) data bank means for storing life information data in a nonvolatile memory;

(d) microprocessor means for receiving the life information data from said input means, storing the life information data in said data bank means, reading the stored life information from the from said data bank means, outputting the life information data when the named date of the life information data is the same as the current date, and controlling said data bank means; and (e) output means for displaying the life information data for the current date superimposed on a video picture on a monitor.

30. The apparatus of claim 22, further comprising:

a power failure compensating circuit for compensating a power failure of the power supplied from the main power controller to supply the compensated power as operating power to the data bank means and to the microprocessor means.

* * * * *